Patented Jan. 26, 1937

2,069,151

UNITED STATES PATENT OFFICE 2,069,151

PROCESS OF RECLAIMING RUBBER

John P. Ioannu, Philadelphia, Pa., assignor to Pennsylvania Salt Manufacturing Company, Philadelphia, Pa., a corporation of Pennsylvania No Drawing. Application March 19, 1935, Serial No. 11,895

9 Claims. (Cl. 18—52)

My invention relates to a process for the reclaiming of rubber stock, and more particularly it relates to an improved process for the direct production of the numerous types of reclaims demanded by the rubber goods manufacturers.

One object of my invention is to provide an improvement in the alkali reclaiming process by which it is possible to manufacture a series of different and distinct rubber reclaims suitable to the needs of the rubber goods manufacturers, which reclaims are differentiated one from the other by their chemical, physical, and mechanical properties.

Another object of the present invention is to enable the reclaim industry by a simple process to prepare directly the different types of reclaims needed for different uses without the admixture of materials foreign to the rubber hydrocarbon during the expensive process of milling and refining.

A further object is to furnish a process by which hard scrap rubber, for example, truck tire stock and other highly vulcanized products which do not soften in the usual alkali reclaiming process, is rendered reclaimable.

Still another object of the invention is to provide a process for reclaiming vulcanized rubber hydrocarbons which is characterized by its economy, its ease of operation, and its high yield of refined product.

Other objects and advantages of the invention will be apparent from a consideration of the specification and claims.

The usual alkali refining process now employed produces a standard type of reclaim, varying only slightly in properties as the conditions of the process are varied. In order to obtain the numerous types of reclaim needed to satisfy the individual requirements of the users, it is necessary to subject the reclaim to an expensive milling operation during which asphaltic, waxy, oily, inert and like materials are incorporated with the rubber hydrocarbon, the length of time of milling and the type of material added governing the properties obtained. For example, the production of the types of dry reclaim, such as those needed for mechanical rubber goods for formulating automobile tops and the like, is an expensive procedure, due to the unusual amount of energy consumed during the milling. It is also difficult, if not impossible, to reclaim hard rubber stock, such as truck tires and other highly vulcanized products, since because of the degree of vulcanization and/or the accelerators used, this type of product does not soften in the usual process and large percentages of hard unrefinable tailings are left after the treatment.

The process of the present invention overcomes all these difficulties. The production of any desired type of reclaim is obtained directly in the digestor, and the expensive manipulations of mechanical working are obviated. Furthermore, there is no necessity of employing foreign plasticizing or drying materials such as have previously been used. The process is applicable for the reclaiming of all types of old rubber stock, including hard, highly vulcanized material.

In the alkali reclaiming process now in general use, the rubber scrap to be rendered useful is treated in a digestor, usually steam jacketed. Caustic soda, water, and oftentimes softening oils and solvents are added, and the charge is agitated and heated under pressure in the digestor for a number of hours until the cellulose has dissolved to a large extent and the rubber has been softened. The reclaimed product is washed, dried, and milled in the presence of various agents until a reclaim of the desired properties is obtained.

The process of the present invention is characterized by the addition to the digestor in the alkali reclaiming process of small amounts of oxidizing agents incapable of exerting a halogenating or halo-hydrinating action on the rubber hydrocarbon. The compound employed may be selected from a large group of available materials, and more than one such compound may be employed if desired. All the compounds of the group favorably affect the reclaiming process and the resulting reclaim, the particular agent or agents employed determining the physical properties of the reclaim. The amount of oxidizing agent employed depends on the result desired, the energy of the oxygen liberated by the compound and the chemical process of its liberation. In general, the amount of oxidizing agent employed is small, and may vary from a few tenths of 1% up to 10% of the weight of the stock treated, although higher concentrations may be utilized for special purposes.

Hypohalite compounds have been suggested for use in digesting the cellulose contained in rubber scrap. This action is very effective and while satisfactory in many instances has certain disadvantages due to the tendency of the halogen of the hypohalite to halogenate the rubber hydrocarbon and to form halo-hydrin compounds therewith. These chemical side reactions may break down the hydrocarbon, rendering the reclaim tacky and unsuitable for high grade mixes. The presence of the halogen compounds in the reclaims also may limit their applicability, since halogenated products are not available for use in making contact with metals or in the manufacture of insulating products. The oxidizing agents of the present process do not possess these drawbacks, since they are incapable of exerting a halogenating or halo-hydrinating action on the rubber hydrocarbon. They produce a mild oxidizing action, accompanied by no side reactions, which action can be regulated and thus makes possible the direct manufacture of reclaims corresponding to the requirements of the reclaim industry.

The oxidizing agents applicable for use may be either inorganic or organic, so long as they possess no halogenating or halo-hydrinating action. The peroxides, persalts and similar products are particularly applicable for use. These compounds are included within the term "oxidizing per-compound" and representative examples are: inorganic—the peroxides of the alkali metal, alkaline earth metal and metal elements; the soluble salts, either inorganic or organic, of the perchloric, percarbonic, perboric, perphosphoric, persulphuric, and persilicic acids; hydrogen peroxide and its derivatives such as its addition products with carbonates, borates, phosphates, and silicates; organic—the organic peroxides such as benzoyl peroxide, lauryl peroxide, and succinyl peroxide; the addition product of urea and hydrogen peroxide; the organic peracids of the formulae R—CO—O—OH, preferably the polybasic organic peracids; the aldehydic-peroxides of the formula R—CH—O—O in both of which cases R is an alkylic or arylic radical of any degree of saturation; the reaction products of organic compounds and ozone, the so-called ozonides in their different degrees of ozonization. In fact, all organic compounds containing active oxygen which is capable of liberation irrespective of the size and type of the group to which the reactive available oxygen is attached are applicable and are included within the term "per-compound."

Closely allied with the per-compounds are the soluble salts of chloric acid and the soluble chromates, and these compounds may be used if desired, although the oxidizing action is much less rapid. In the case of these compounds, as with the per-compounds, the oxygen is liberated from the compounds directly during the process, and no side reactions take place. The chromates, for example, in alkaline solution are known to behave as oxygen carriers and transfer oxygen from the air to the system.

As previously pointed out, the nature of the reclaim obtained as the result of the process will depend upon the particular oxidizing agent and the amount thereof employed with the alkaline liquor in the digestion. Thus with the persalts, such as ammonium persulphate, reclaims are obtained which are dry in appearance, and are not markedly elastic or resilient. These reclaims have the mechanical and physical properties desired for manufacturing articles for which neither a tacky nor a nervy reclaim is suitable, for example, for use in compounds for automobile tops and the like. The peroxides, such as hydrogen peroxide and urea-peroxide furnish reclaims which are characterized by more resilient and elastic properties. These reclaims also, however, are not tacky. Different types of reclaims are obtained when chlorates are used and the sole reduction permits easy regulation of the oxidizing effect, the reaction being controlled without serious degradation of the rubber hydrocarbon.

In a typical example 1,000 pounds of properly shredded waste rubber stock is placed in a digestor with 3,000 pounds of water and 150 pounds of caustic soda. To the digestor 3 to 5 pounds of ammonium persulphate crystals are added. The digestor is sealed and the mass is heated and agitated for a period of 12 to 16 hours at a temperature corresponding to a steam pressure of 175 to 220 pounds per square inch. Thereafter, the reclaimed rubber mass is discharged from the digestor, washed and dried. The process provides a reclaim which may be refined in the usual way, but a higher refining yield per unit of time and a marked reduction in the amount of tailings is afforded.

The reclaimed product is characterized by its dryness, which term is employed to describe a product which is not markedly elastic or resilient. In a further example in which there is present the same amount of rubber, water and caustic soda 2 to 4 pounds of urea peroxide are added to the digester and the process continued as described in the preceding example. If desired, 4 to 8 pounds of pyrophosphate may be added to stabilize and regulate the liberation of oxygen from the urea peroxide. The reclaimed product thus obtained is characterized by its resilient qualities, but without any tendency to tackiness.

Still another example where the amounts of rubber, water and caustic soda are the same as in the first, 4 to 8 pounds of sodium or potassium chlorate are added to the digestor. Thereafter the process is carried out as previously described, but in general it is advisable to increase the period of treatment in order to insure complete digestion. The reclaimed product obtained by this example is characterized by properties which are intermediate between the dryness of the reclaimed product of the first example and the resiliency of the reclaimed product of the second example.

Considerable modification is possible in the steps employed in digestion, as well as in the type and amounts of oxidizing agent requisite without departing from the essential features of my invention.

I claim:

1. In the alkali digestion process of reclaiming scrap rubber, the steps which comprise digesting with heat a mixture of rubber scrap, water, caustic soda, and a small quantity of an oxidizing agent selected from the group consisting of:—an oxidizing per-compound, a chlorate, a soluble chromate—and thereafter removing the reclaimed product from the liquor.

2. In the alkali digestion process of reclaiming scrap rubber, the steps which comprise digesting with heat a mixture of rubber scrap, water, caustic soda, and a small quantity of an oxidizing per-compound, and thereafter removing the reclaimed product from the liquor.

3. In the alkali digestion process of reclaiming scrap rubber, the steps which comprise digesting with heat a mixture of rubber scrap, water, caustic soda, and a small quantity of an oxidizing persalt, and thereafter removing the reclaimed product from the liquor.

4. In the alkali digestion process of reclaiming scrap rubber, the steps which comprise digesting with heat a mixture of rubber scrap, water, caustic soda, and a small quantity of ammonium persulphate, and thereafter removing the reclaimed product from the liquor.

5. In the alkali digestion process of reclaiming scrap rubber, the steps which comprise digesting with heat a mixture of rubber scrap, water, caustic soda, and a small quantity of a peroxide, and thereafter removing the reclaimed product from the liquor.

6. In the alkali digestion process of reclaiming scrap rubber, the steps which comprise digesting with heat a mixture of rubber scrap, water, caustic soda, and a small quantity of an inorganic peroxide, and thereafter removing the reclaimed product from the liquor.

7. In the alkali digestion process of reclaiming scrap rubber, the steps which comprise digesting with heat a mixture of rubber scrap, water, caustic soda, and a small quantity of hydrogen peroxide, and thereafter removing the reclaimed product from the liquor.

8. In the alkali digestion process of reclaiming scrap rubber, the steps which comprise digesting with heat a mixture of rubber scrap, water, caustic soda, and a small quantity of an organic peroxide, and thereafter removing the reclaimed product from the liquor.

9. In the alkali digestion process of reclaiming scrap rubber, the steps which comprise digesting with heat a mixture of rubber scrap, water, caustic soda, and a small quantity of urea peroxide, and thereafter removing the reclaimed product from the liquor.

JOHN P. IOANNU.